Figure 1:
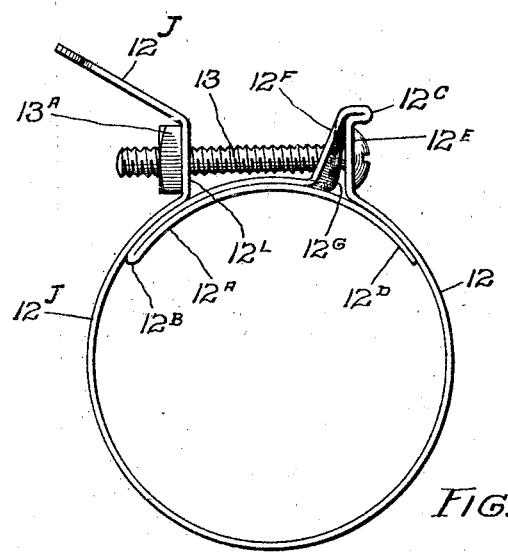

May 11, 1926.

C. VITEK

HOSE CLAMP

Filed August 13, 1924

1,584,498

INVENTOR
Charles Vitek
BY Frank Schraeder Jr
ATTY.

Patented May 11, 1926.

1,584,498

UNITED STATES PATENT OFFICE.

CHARLES VITEK, OF OMAHA, NEBRASKA.

HOSE CLAMP.

Application filed August 13, 1924. Serial No. 731,799.

This invention relates to improvements in hose clamps and has among its objects the provision of a simple, efficient and practical hose clamp involving improved features of construction.

It is also an object to provide a hose clamp which is adapted for quick release.

Another object of the invention resides in the provision of a rectangular nut for the tightening bolt member. In the present practice and construction it quite often happens that the bolt and nut bind during tightening of the clamp so that the bolt tends to bend and this is caused by the longitudinal center of the bolt being too high above the drawing point of the band.

A still further object is to provide a clamp of a single band having an integral double tongue forming a bridge between tightening ends of the band.

With these and other objects in view, an embodiment of the invention is illustrated in the accompanying drawing and is described in the following specifications, the novel features being pointed out in the appended claim.

Figure 3:
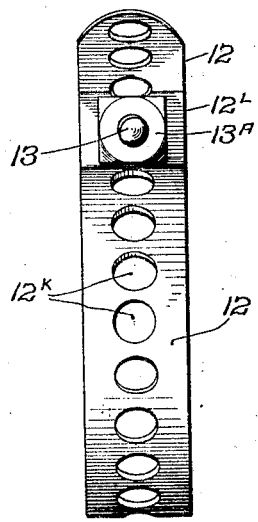
Figure 2:
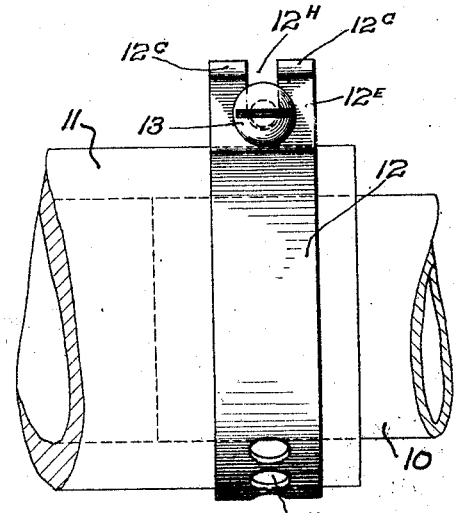

In the drawings:

Figure 1 is an end elevation of a clamp embodying my invention and Figures 2 and 3 are side elevations of same.

Referring to the drawings, the clamp is shown connecting or clamping a pipe 10 telescoped within a hose 11 and the structure shown comprises a single continuous flexible band 12 of steel or any other suitable material.

In making the clamp from a plain strip of material, the band is folded over itself from a point $12^C$ near one of its ends, the end $12^A$ forming a tongue which is also folded over itself at the point $12^B$ and which tongue forms a strong bridge between the tightening portions of the clamp. The end $12^D$ of the tongue portion extends back under the band portion.

At the point of bending $12^C$, the doubled band is bent angularly for a short distance on approximately a radial line from the center of the clamp to form a brace portion $12^F$ for the vertical wall portion $12^E$. The brace portion $12^F$ is further depressed as at $12^G$.

The upper end of the wall $12^E$ and the brace portion $12^F$ are slotted as shown at $12^H$ to receive the shank of the bolt 13.

The other end $12^J$ of the band is provided with a plurality of holes $12^K$ to afford adjustability of the clamp for slightly varying diameters.

It will be observed that the nut $13^A$ is constructed with a minimum of metal below the shank of the bolt to bring the longitudinal center line of the bolt as close as possible to the drawing point of the band. This feature of construction overcomes the frequent binding of the nut and bolt during tightening of the clamp as the pull on the band is brought closer to the longitudinal center line of the tightening bolt.

In adjusting the clamp as to diameter, the proper slot $12^K$ is first determined and the band can then be readily bent with a pair of pliers to form the abutment wall $12^L$ for the nut $13^A$.

I claim:

A clamp comprising a unitary band of flat flexible material, said band being bent over itself near one end thereof to form an angularly disposed wall for the head of the bolt tightening member, a doubled tongue portion integral with said wall forming a bridge between the other end of the band and said wall, the inner portion of said doubled tongue portion extending under the circumferential band portion, and a tightening bolt member extending between said wall and other end of the band.

In witness whereof I affix my signature.

CHARLES VITEK.